United States Patent [19]

Hoppmann et al.

[11] 4,094,412
[45] June 13, 1978

[54] ROLLING METHOD OF SORTING PARTICULATE ARTICLES

[75] Inventors: Kurt H. Hoppmann, Falls Church, Va.; George W. Edmunds, Derwood, Md.

[73] Assignee: Hoppmann Corporation, Springfield, Va.

[21] Appl. No.: 746,024

[22] Filed: Nov. 30, 1976

[51] Int. Cl.² ............................................. B07C 5/04
[52] U.S. Cl. .................................. 209/106; 198/384; 198/443; 198/803
[58] Field of Search ...................... 209/73, 82, 97, 106, 209/107; 198/384, 387, 392, 386, 443, 779, 803

[56] References Cited

U.S. PATENT DOCUMENTS

| 2,933,174 | 4/1960 | Hait et al. | 198/386 |
| 3,049,215 | 8/1962 | Hutter et al. | 198/392 X |
| 3,900,107 | 8/1975 | Hoppmann | 209/73 |
| 3,918,571 | 11/1975 | Noguchi | 198/803 X |

Primary Examiner—Joseph J. Rolla
Attorney, Agent, or Firm—David H. Semmes

[57] ABSTRACT

High speed feeding, counting, orienting and storing of small parts such as ammunition, candy, pills, machine screws, nuts, miniature containers and the like. The articles are radially distributed upon a rotating planar surface having an axis; the articles are then advanced upon a plurality of peripherally spaced spindles or rollers which extend radially outwardly from the axis. The articles are then discharged from the spindles. The spindles may be of the idler or power driven type enabling the sorting of heavy parts. For example, the spindles may be rotated at a speed proportional to the rotational speed of the inner axis, such that the high surface speed of the individual rollers will enhance discharge, alternatively, the rollers may be rotated at a speed lower than the rotational speed of the inner axis which will enhance radial distribution prior to discharge.

22 Claims, 16 Drawing Figures

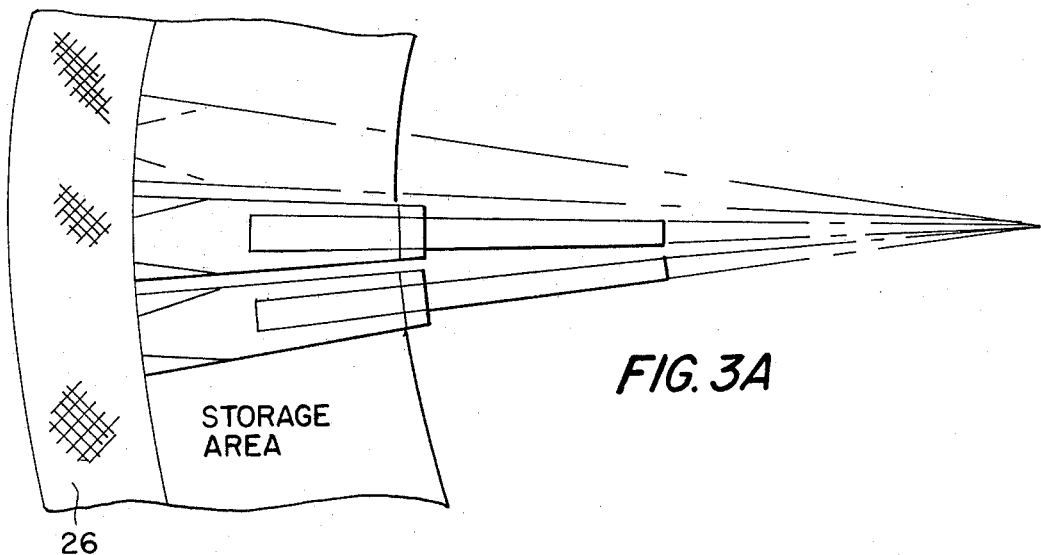
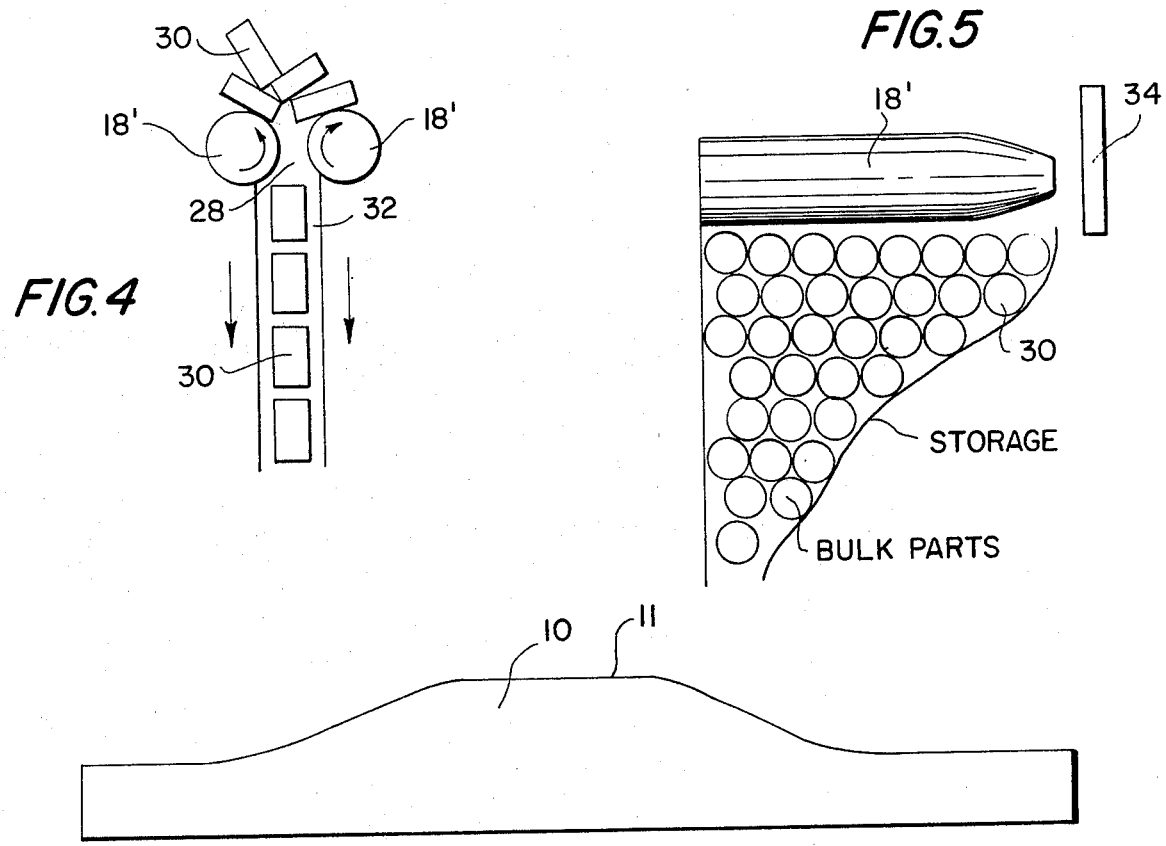

ROLLING METHOD OF SORTING PARTICULATE ARTICLES

CROSS-REFERENCES TO RELATED APPLICATIONS:

An improvement upon ROTATING METHOD OF SORTING PARTICULATE ARTICLES (Pat. No. 3,900,107). In the present invention the moving surface ramp and discharge ramp may be replaced by rotating radially positioned spindles or rollers.

BACKGROUND OF THE INVENTION (1) Field of the Invention

Increasing attention is being given to methods for high speed orientation of nails, pills, machine screws, nuts, small arms munitions and the like. Recent inventors have evolved a plurality of rotating devices which centrifugally discharge articles to be counted from the edges of a rotating plane. Traditionally, these centrifugally distributed articles are forced through a separate stationary exit aperture and then counted in a separate orienting and counting mechanism.

The separate orienting and counting is time consuming, subject to jamming and breakdown and economically discouraging due to greater capital cost and space required for operation.

Noise is now a major consideration in feeding parts even at relatively slow speeds. Government regulations, company regulations, and soon labor union regulations will demand that only silent feeders be installed.

The purpose of the invention is the use of rotating rollers to propel the parts, rather than using rotating inner planes or vibrating members.

SUMMARY OF THE INVENTION

According to the present invention the particulate articles being sorted are radially distributed from an inner axis which may be stationary or rotating. The articles are then advanced from the inner axis upon a plurality of peripherally spaced spindles extending radially outwardly of the inner axis and the articles are discharged either peripherally or from beneath the spindles. The spindles or rollers may be positioned upon stationary axes, such that their speed of rotation is relative to the speed of rotation of a circular power drive which may contact the rollers from beneath. Alternatively, the spindles may be power driven, grooved, tapered, or placed in spaced array so as to vary the method of discharge. A ramp assembly may be employed beneath a peripheral segment of the spindles, such that the level of the spindles is pivoted upwardly to the level of a discharge rim or conveyor above the inner axis.

BRIEF DESCRIPTION OF THE DRAWINGS

FIG. 3A is a fragmentary top plan showing disposition of a peripheral storage area beneath the rotating spindles;

FIG. 4 is a fragmentary elevation, partially in section, showing a pair of spaced spindles, gaging the discharge of articles therebeneath;

FIG. 5 is a fragmentary elevation, partially in section, showing the storing of bulk parts beneath the pair of spaced spindles;

FIG. 6 is a side elevation, showing the profile of a cam plate 10 having an elevated mid portion 11 for raising the spindle 18 tips, for example, to the level of discharge to a rim conveyor;

In FIG. 1 a rotating inner plane 10 is illustrated as supported centrally with respect to a series of outer spindles 18 supported upon individually pivotable axes 20 having their inner ends supported intermediate inner plane periphery 16 and base support 12, as well as medial block 14 defining shoulders 22 and 24. The rollers may be individually power driven or may be of the idler configuration such that their engagement with ramp 30 causes a rotation consonant with the speed of rotation of the inner plane 10.

Figure 1:
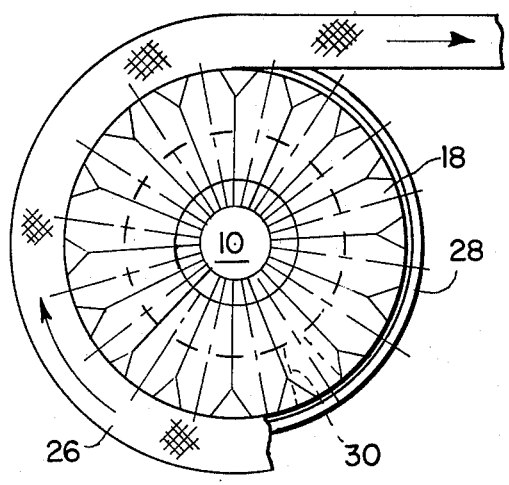
FIG. 1 is a top plan, showing a rotating inner plane, radially extending outward spindles and a roller or rim conveyor used to discharge the articles.
Figure 2:
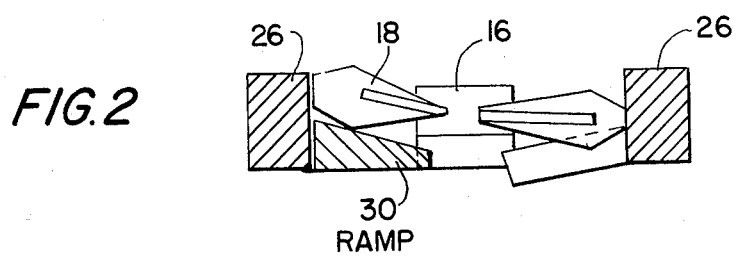
FIG. 2 is a vertical elevation, showing employment of a ramp assembly pivoting the spindles upwardly in a segment of their periphery.
Figure 3:
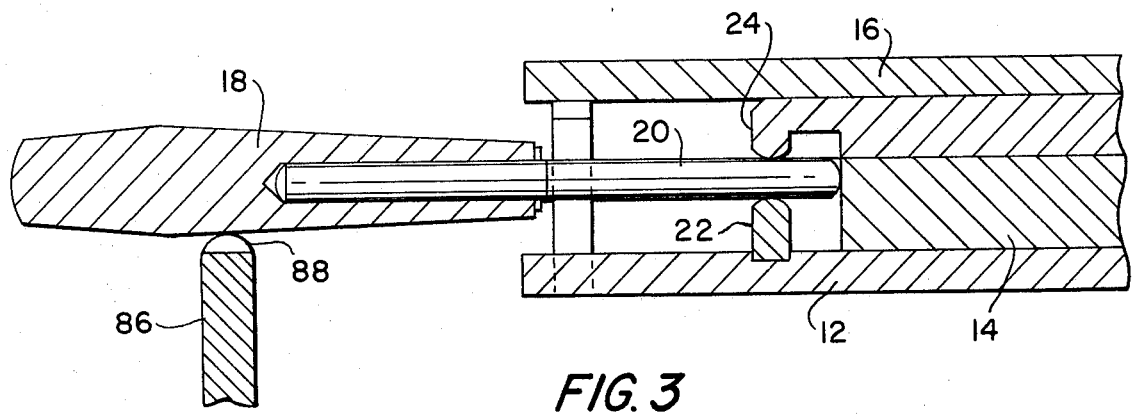
FIG. 3 is an enlarged side elevation, showing support of the individually pivotable axis and spindles adjacent the rotating inner plane.

A rim conveyor 26 of the belt type or power driven roller type may be employed adjacent the outer ends of the spindles 18 as a discharge mechanism.

In FIG. 4 a pair of rollers 18 are illustrated in spaced array, such that bulk parts 30 are discharged downwardly through slot 28 and into a storage chute 32. The parts may be stored beneath the roller spindles as illustrated in FIG. 5 and blocked from peripheral discharge by vertical baffle 34.

In the cited U.S. Pat. No. 3,900,107 the centrifugal feeders consist of a rotating inner disc and a concentrically rotating rim, the rim being at a higher elevation than the disc. Both disc and rim rotate in the same direction although not necessarily at the same speed. The disc is flexible and passes over a stationary cam which lifts the disc periphery to the same elevation as the rim. Parts placed on the disc in random array are transferred to the rim which, being wide enough to support only one part, passes a singulated stream of parts to a tangential exit. Depending upon the shape of the part, it may also be possible to allow only properly oriented parts to pass through the tangential exit.

The present invention replaces the disc and/or the rim with individual idler or powered rollers. Depending upon the type of part being sorted, it may not be necessary to employ an outer discharge rim.

Replacing the disc with rollers or spindles 18 permits heavy parts to be fed onto the discharge rim. Heavy parts will have a tendency to cause a flexible disc to buckle under the weight of the parts. One means of using the rollers to replace the disc is to mount the rollers on shafts 20 and rotate the entire assembly about the plane centerline. If the rollers 18 are caused to ride over the stationary support or ramp 30 which also acts to lift rollers 18 to the level of the rim discharge mechanism 26, the rollers will rotate at a speed proportional to the rotational speed of the assembly but faster by the ratio of the roller diameters to the support diameter. Because of this high ratio, very high surface speeds will be available at low rotational speeds. The rollers may be specially configured to accomplish specific tasks. The ends of the rollers may be tapered to assist in the transfer of the parts from the disc rollers to the rim. The rollers may be grooved to assist the parts in moving to the outer perimeter. The rollers may be grouped in pairs and spaced at specific intervals so that the spacing acts as a gaging groove which discharges the parts vertically below the disc section.

It is also possible by varying the diameter of particular rollers to cause these rollers to act as the ramp to lift the parts to a higher elevation. In this case it would not be necessary to rotate the disc assembly but only to drive the rollers.

If the rollers are driven, it will no longer be necessary for the roller support to rotate in order that the parts be moved along. With such a stationary roller support surrounding the inner plane, certain rollers may be specially configured to orient the parts as they pass along towards the exit. For example, parts can be oriented on either the inside or the outside of the rim with the rejected parts being returned to the inner plane from either the inside or the outside of the rim.

It is also possible to transfer the parts radially from the rim to a belt or chain traveling beside the rim assembly or in line with the exit of the rim assembly, as illustrated in FIG. 1.

The present design is based upon a concept of a rolling moving surface ramp and is applicable for larger machines.

The basic moving surface ramp design in Pat. No. 3,900,107 is versatile for moving, unscrambling and orienting parts in conjunction with various rims and aperture ring designs also patented.

As parts to be unscrambled and to be oriented have to move outward while the moving surface ramp rotates, the resulting force acting upon a particle is the centrifugal force minus the frictional force caused by the surface friction of the moving surface ramp against the particle to be moved.

As the coefficient of rolling friction is far less than the coefficient of sliding and static friction it follows that particles can be moved more rapidly and with controlled speed in a spiral path toward the periphery.

The present rolling moving surface ramp introduces capabilities for handling heavy parts such as are experienced in the automotive industry.

Also, the method may be applied to the separation of chips and dirt usually dumped with parts into the feeder bowl.

Basically, the design consists of tapered rollers radially arranged and moving freely around their axis. Each roller is supported by a shaft being in the true axis of the roller.

The shafts are mounted in a hub like structure, permitting the shafts to move annularly up and down around a pivot point being inward from the position of the roller.

This movement will enable the top surfaces of all rollers to form the same shape or pattern as is required by the solid sheet moving surface ramp in U.S. Pat. No. 3,900,107. In other words, a reservoir and a transfer area to the discharge area can be designed with the greatest degree of freedom, permitting parts to move outwardly and circularly.

The particular shape and surface action of each roller as can be chosen with this design yields tremendous flexibility for various parts to be unscrambled and oriented, examples of design are further illustrated in FIGS. 7–15.

Each roller can turn around its own axis. Depending on how the rollers are driven they can be stationary relative to the supporting frame and inner plane or they can revolve around the main axis of the inner plane.

The same relative motion between rollers and supporting frame is also true for the circumferential discharge assembly. This feature will enable rollers to be stationary relative to the frame while they rotate around their own axis.

The benefit of this arrangement is that rollers of various shapes and surface conditions can be mounted for establishing orientation of parts at a certain point at the circumference.

The foregoing is described with respect to a number of rollers all turning in the same direction. The mounting and the drive of these rollers can also be arranged to function in various other ways.

If rollers are mounted so that a fixed gap exists between them as in FIG. 4 then this gap can be used to discharge parts in a desired orientation. For this purpose, the roller can work in uni-directional movement or in opposed movement.

If rollers are mounted so that a fixed gap 28 exists between them as in storage chute 32, parts may then be discharged downwardly and stored, as in FIG. 5. In this arrangement a vertical guard or baffle 34 may be positioned at the radial extremities of spindle 18'.

Figure 12:
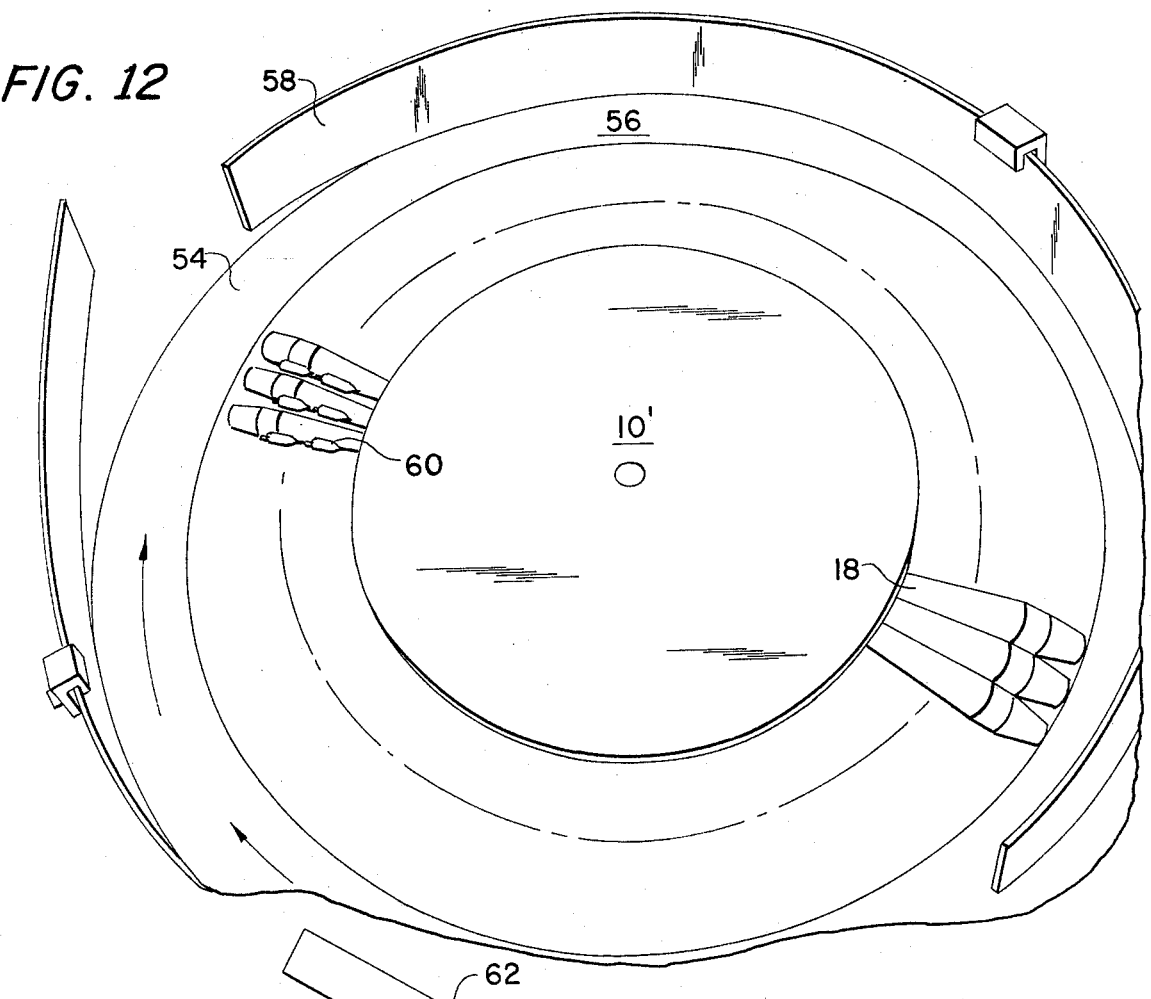
FIG. 12 is a perspective view, showing articles in the form of photo flashbulbs being discharged from a rotating inner plane onto the roller spindles and thence onto a rotating outer rim.

A side ways peripheral discharge is illustrated in FIG. 12 which enables storage of parts. "Gaging" the number of particles stored per channel can result in a discharge of pre-counted number of particles.

If roller pairs 18 are arranged in a circular fashion around a common axis, a multi-channel orienting and/or counting system results. Discharge of one channel per time or a multiple of channels will result in any number of pre-rated particles to be discharged.

The relative ease and high speed which can be accomplished in a multi-channel feeder orienter will far exceed any performance of a single feed machine.

The application of multi-channel and multi-particle discharge per channel lends itself also for matrix orientation of particles.

Matrix orientation is required for packaging application where a number of parts have to be located in rows and with a certain number of particles to be put in each row.

Figure 7:
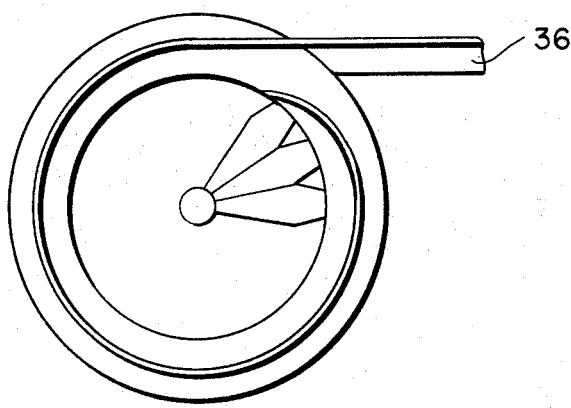
FIG. 7 is a top plan of a form of the invention wherein the articles are radially distributed from an inner axis, advanced upon the rotating spindles and discharged radially from the spindles onto a flat stationary rim 46.

In FIG. 7 there is illustrated the modification wherein the articles are discharged from spindles 18' onto a stationary, flat discharge rim 36.

Figure 8:
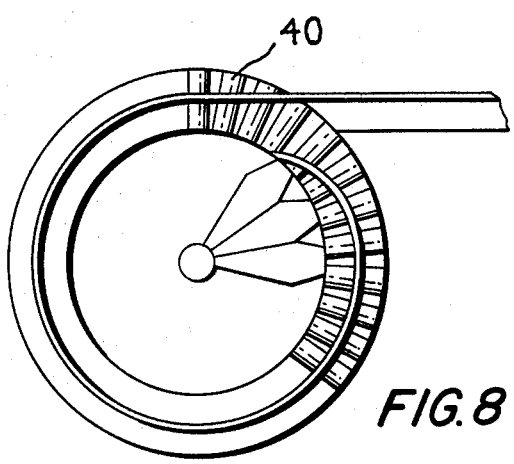
FIG. 8 is a fragmentary top plan of another form of the invention wherein the articles are discharged radially from the rotating spindles and onto a discharge rim of rotating rollers, which may be either idler or driven.

In FIG. 8 there is illustrated a further modification wherein the articles are discharged radially from the spindles onto a discharge rim comprised of individual rollers 40 which may be of the idler or power driven type.

Figure 9:
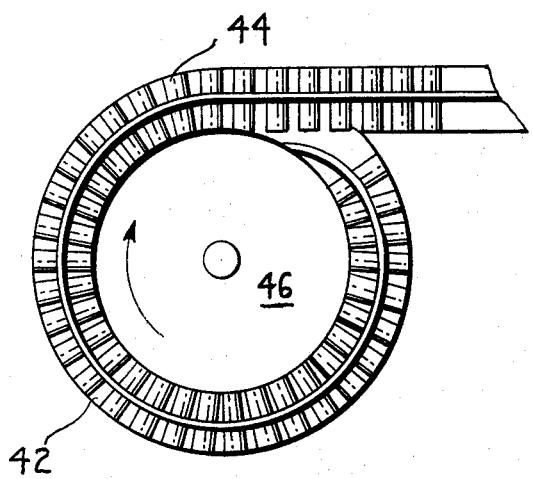
FIG. 9 is a fragmentary top plan of a further modification of invention where the articles are discharged from a conical inner axis onto a peripheral rim of idler or driven rollers.

In FIG. 9 there is illustrated the further modification wherein the articles may be discharged from a stationary or rotating inner conical surface 46 onto discharge rim 42 comprising individual idler or power driven rollers 44.

Figure 10:
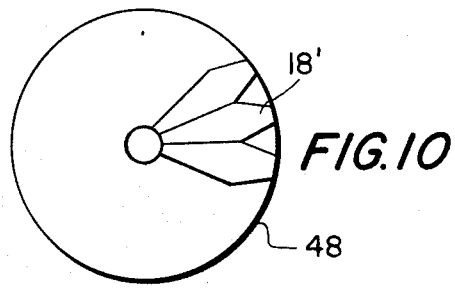
FIG. 10 is another form of invention wherein the articles are discharged vertically downwardly from the outer tips of the spindles.

In FIG. 10 the articles are discharged from the spindle ends vertically downwardly as at 48 by gravity means.

Figure 11:
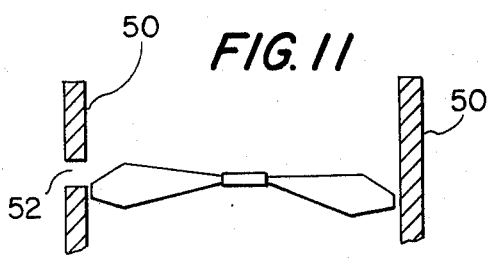
FIG. 11 is a vertical elevation, partially in section, showing a gaging rim, having gaging apertures communicating with the tip ends of the spindles.

In FIG. 11 there is illustrated the method of gaging discharging from the outer ends of the spindles 18' by means of a baffle 50, having a series of gaging apertures 52, which singulate the articles being discharged.

In FIG. 12 there is illustrated a method for sorting photo flashbulbs 60 by means of rotating inner plane 10, and radially disposed, rotating spindles 18 which may be pivoted upwardly to engage discharge chute 54 as at the sector designated 56. An optional vertical discharge baffle 58 may also be employed.

Figure 13:
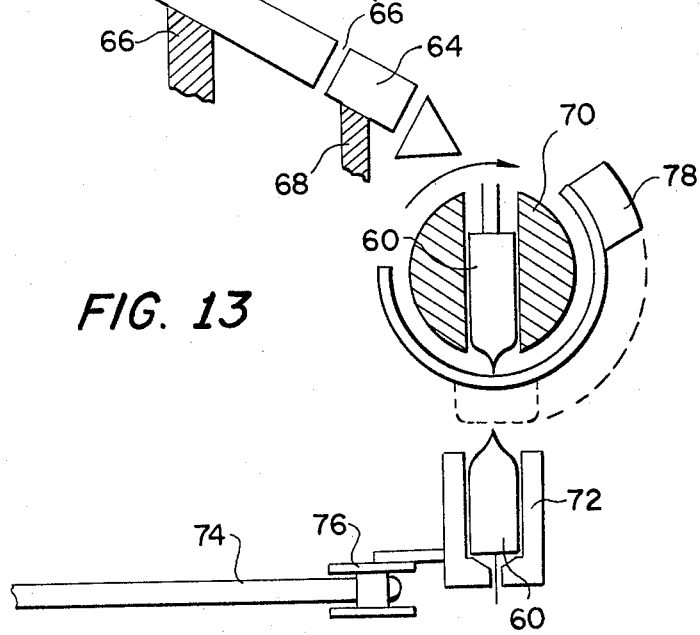
FIG. 13 is a fragmentary vertical section, showing separate driving of the individual spindle elements by means of cams contacting selectively from beneath the inner and outer portions of the rollers, so as to rotate selectively the rollers and thereby gage discharge of a photo flashbulb into a magnetically oriented and pivoted indexer.

In FIG. 13 there is illustrated a modified spindle comprised of inner rotatable section 62, a circular groove 66 and an outer rotatable section 64. Sections 62 and 64 may be rotated selectively by roller drive cams 66 and 68 such that the photo flashbulb elements 60 may be held stationarily as at groove 66, then discharged by engagement of outer cam 68 with outer section 64, so as to rotate outer section 64 and thereby discharge photoflash element 60. Element 60 then drops into the pivotable indexer 70, having an external magnetic element 78. As rotating sprocket 74 with collet 72 supported upon linkage elements 62 presents itself, the magnet may be attracted to collet 72, then dropping of the photo flash elements 60 within the collet.

Figure 14:
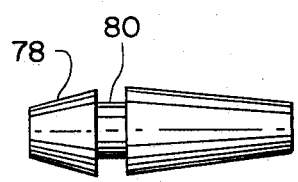
FIG. 14 is a front elevation of a spindle having a circular groove therein, defining with an adjacent and similar spindle a vertical exit aperture.

FIG. 14 illustrates a modified spindle 78 having external groove 80, which with an adjacent spindle may define a vertical exit aperture.

Figure 15:
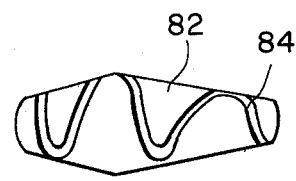
FIG. 15 is a showing of a modified spindle having a sinuous bead, defining together with an adjacent spindle counterpart an helical guide for the advancement of the discharging articles outwardly to the spindle ends.

In FIG. 15 modified spindle 82 is shown with a sinuous bead 84 which together with a similar bead in an adjacent spindle may define an hellical groove for the accelerated radial discharge of the articles being sorted.

As will be apparent, the rollers may be individually driven, or be driven by rotation of a circular rim contacting their lower surfaces. The rollers may be modified to provide a singulated stream along each roller pair so as to always deliver 100% outward from the peripheral edges. Roller pairs providing this singulated stream of parts may have their discharge controlled by an escapement baffle to only deliver one part per revolution. The entire roller mat may rotate as a unitary assembly or the assembly may be stationary with the rollers individually driven. The rollers may be provided with a rotating or stationary inner ring. The rollers may be horizontal or inclined and may be pivoted to change their attitude during rotation. In the outer roller rim, the rollers may be contoured to orient or selectively accept or reject parts and may be otherwise modified as in the inner rim.

Manifestly, varous changes may be made in the spindle configuration and away without departing from the spirit and scope of the present invention.

We claim:

1. Rolling method of sorting particulate articles comprising:
   (A) radially distributing said articles upon a member having an axis;
   (B) advancing said articles upon a plurality of peripherally spaced rotating spindles extending radially outwardly of said axis, and
   (C) discharging said articles from said spindles.

2. Rolling method of sorting particulate articles as in claim 1, including discharging of articles from said spindles onto a stationary rim.

3. Rolling method of sorting particulate articles as in claim 1, including discharging of articles from said spindles onto a peripheral path of rollers.

4. Rolling method of sorting particulate articles as in claim 1, further including:
   (D) gaging, so as to singulate said articles, during said discharging from said spindles.

5. Rolling method of sorting particulate articles as in claim 1, including selectively rotating inner and outer portions of adjacent spindles, so as to regulate the speed of said discharging.

6. Rolling method of sorting particulate articles as in claim 1, wherein said discharging is via conjoined apertures in adjacent spindles, defining a vertical exit aperture.

7. Rolling method of sorting particulate articles as in claim 1, including discharging through a helically defined groove in adjacent spindles.

8. Rolling method of sorting particulate articles comprising:
   (A) radially distributing while accelerating said articles upon a rotating inner plane;
   (B) centrifugally advancing said articles upon a plurality of peripherally spaced spindles extending radially outwardly of said plane, and
   (C) discharging said articles from said spindles.

9. Rolling method of sorting particulate articles as in claim 8, wherein said discharging is peripherally of said spindles.

10. Rolling method of sorting particulate articles as in claim 8, wherein said discharging is beneath said spindles.

11. Rolling method of sorting particulate articles as in claim 8, including positioning a roller conveyor means adjacent the outward ends of said spindles so as to carry away said particulate articles being discharged.

12. Rolling method of sorting particulate articles as in claim 8, wherein said axes are positioned stationarily with respect to said rotating plane.

13. Rolling method of sorting particulate articles comprising:
   (A) radially distributing while accelerating said articles upon a rotating plane;
   (B) advancing said articles upon a plurality of radially extending peripherally spaced spindles;
   (C) rotating said spindles at a speed consonant with said rotating plane;

(D) peripherally discharging said articles from said spindles;

(E) pivoting said spindles upwardly through a portion of their rotation in series so as to deliver said articles to a plane elevated with respect to said rotating plane.

14. Rolling method of sorting particulate articles as in claim 13, wherein said rotating plane has a center portion higher than its peripheral portion.

15. Rolling method of sorting particulate articles as in claim 13, wherein said spindles are rotated at said consonant speed by engagement with a ramp supported beneath a peripheral segment of said spindles as a transitional guide from the level of said plane to said elevated plane.

16. Rolling method of sorting particulate articles as in claim 13, wherein said advancing of said articles upon said rotating spindles is faster than the speed of rotating said spindles.

17. Rolling method of sorting particulate articles as in claim 13, including individually rotating said spindles upon a plurality of individual radially extending axes.

18. Rolling method of sorting particulate articles as in claim 17, wherein said spindles are driven at random rotational speeds.

19. Rolling method of sorting particulate articles as in claim 13, including peripherally spacing said spindles so as to gage articles being discharged therebeneath.

20. Rolling method of sorting particulate articles as in claim 19, including storing said particulate articles beneath said spindles.

21. Rolling method of sorting particulate articles as in claim 19, including varying the spacing of said spindles, so as to gage various sized particulate articles.

22. Rolling method of sorting particulate articles as in claim 21, wherein said spindles are supported in an array of pairs, each pair defining a discharge channel.

* * * * *